(12) United States Patent
Urade et al.

(10) Patent No.: US 10,774,270 B2
(45) Date of Patent: Sep. 15, 2020

(54) CONVERSION OF BIOMASS OR RESIDUAL WASTE MATERIALS TO BIOFUELS

(71) Applicant: SHELL OIL COMPANY, Houston, TX (US)

(72) Inventors: Vikrant Nanasaheb Urade, Bangalore (IN); Alan Anthony Del Paggio, Spring, TX (US); Laxmi Narasimhan Chilkoor Soundararajan, Bangalore (IN)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 15/569,432

(22) PCT Filed: Apr. 25, 2016

(86) PCT No.: PCT/EP2016/059116
§ 371 (c)(1),
(2) Date: Oct. 26, 2017

(87) PCT Pub. No.: WO2016/173958
PCT Pub. Date: Nov. 3, 2016

(65) Prior Publication Data
US 2018/0298288 A1    Oct. 18, 2018

(30) Foreign Application Priority Data
Apr. 27, 2015   (IN) .......................... 2134/CHE/2015

(51) Int. Cl.
*C10G 1/06* (2006.01)
*C10G 1/00* (2006.01)
(Continued)

(52) U.S. Cl.
CPC .............. *C10G 1/06* (2013.01); *C10G 1/002* (2013.01); *C10G 1/086* (2013.01); *C10G 3/50* (2013.01);
(Continued)

(58) Field of Classification Search
None
See application file for complete search history.

(56) References Cited

U.S. PATENT DOCUMENTS

| 6,620,313 B1* | 9/2003 | Demmin | B01J 23/002 208/112 |
| 2006/0169572 A1 | 8/2006 | Meier et al. | |

(Continued)

FOREIGN PATENT DOCUMENTS

| BR | PI0903587 A2 | 2/2011 |
| CA | 1163595 A | 3/1984 |

(Continued)

OTHER PUBLICATIONS

International Search Report and Written Opinion received for PCT Patent Application No. PCT/EP2016/059116, dated Jun. 17, 2016, 9 pages.

*Primary Examiner* — Philip Y Louie

(57) ABSTRACT

The present invention provides a process for producing liquid hydrocarbon products from solid biomass and/or residual waste feedstocks, said process comprising the steps of: a) a first stage of hydropyrolysing the solid feedstock in a hydropyrolysis reactor vessel in the presence of molecular hydrogen and one or more deoxygenation catalysts, producing a product stream comprising partially deoxygenated hydropyrolysis product, $H_2O$, $H_2$, $CO_2$, CO, $C_1$-$C_3$ gases, char and catalyst fines; b) removing said char and catalyst fines from said product stream; c) a second stage of hydroconverting said partially deoxygenated hydropyrolysis product in a hydroconversion reactor vessel in the presence of one or more hydroconversion catalysts and of the $H_2O$, $CO_2$, CO, $H_2$, and $C_1$-$C_3$ gas generated in step a), producing a vapour phase product comprising substantially fully deoxygenated hydrocarbon product, $H_2O$, CO, $CO_2$, and $C_1$-$C_3$ gases; d) condensing the vapour phase product of step d) to (Continued)

provide a liquid phase product comprising substantially fully deoxygenated C4+ hydrocarbon liquid and aqueous material and separating said liquid phase product from a gas phase product comprising $H_2$, CO, $CO_2$, and $C_1$-$C_3$ gases; e) removing the aqueous material from the substantially fully deoxygenated C4+ hydrocarbon liquid; and f) a third stage comprising combining an aliphatic hydrocarbon precursor or an aromatic hydrocarbon precursor with at least a portion of the substantially fully deoxygenated C4+ hydrocarbon liquid and co-processing the resultant liquid in a hydroprocessing reactor vessel in the presence of hydrogen and one or more hydroprocessing catalysts.

10 Claims, 4 Drawing Sheets

(51) Int. Cl.
 *C10G 1/08* (2006.01)
 *C10G 3/00* (2006.01)
(52) U.S. Cl.
 CPC ............... *C10G 2300/1003* (2013.01); *C10G 2300/1011* (2013.01); *C10G 2300/1014* (2013.01); *C10G 2300/1018* (2013.01); *Y02P 30/20* (2015.11)

(56) References Cited

U.S. PATENT DOCUMENTS

| | | |
|---|---|---|
| 2008/0161614 A1* | 7/2008 | Bertoncini ............. C10G 45/08 585/240 |
| 2010/0076238 A1* | 3/2010 | Brandvold ............. C10G 45/58 585/324 |
| 2010/0251615 A1* | 10/2010 | Marker .................... C01B 3/16 48/127.7 |
| 2011/0068047 A1 | 3/2011 | Gudde et al. |
| 2012/0116134 A1 | 5/2012 | Bozzano et al. |
| 2013/0338412 A1* | 12/2013 | Marker ................. C10G 1/002 585/240 |
| 2014/0100395 A1 | 4/2014 | Felix et al. |
| 2015/0166434 A1* | 6/2015 | Ward ................. B01J 35/0006 585/319 |
| 2017/0009143 A1 | 1/2017 | Urade et al. |

FOREIGN PATENT DOCUMENTS

| | | |
|---|---|---|
| CN | 101760234 A | 6/2010 |
| CN | 101784642 A | 7/2010 |
| WO | 8301781 A1 | 5/1983 |
| WO | 2006078023 A1 | 7/2006 |
| WO | 2008136476 A1 | 11/2008 |
| WO | 2009082366 A1 | 7/2009 |
| WO | 2009090335 A2 | 7/2009 |
| WO | 2010117437 A1 | 10/2010 |

\* cited by examiner

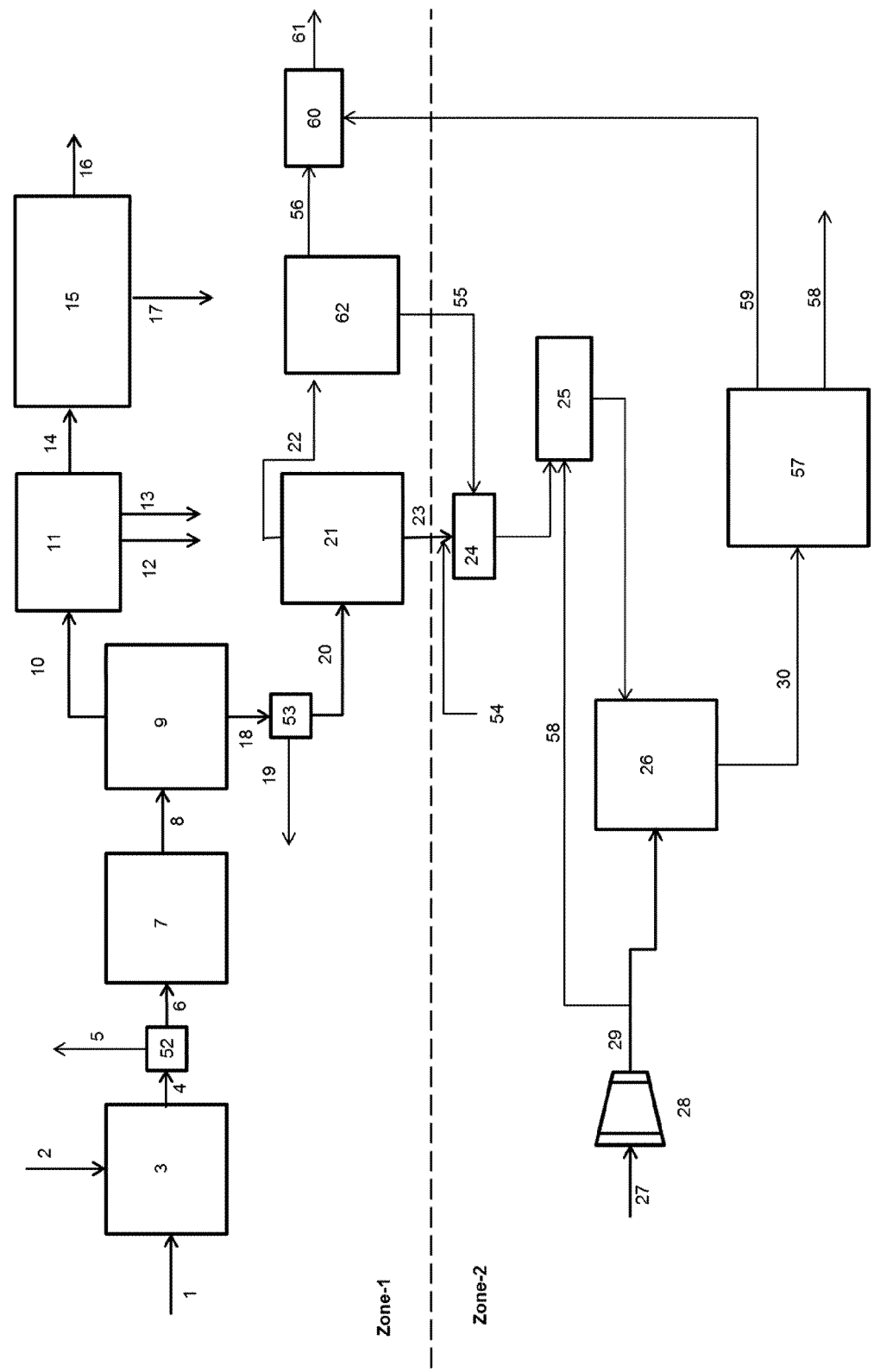

CONVERSION OF BIOMASS OR RESIDUAL WASTE MATERIALS TO BIOFUELS

PRIORITY CLAIM

The present application is the National Stage (§ 371) of International Application No. PCT/EP2016/059116, filed Apr. 25, 2016, which claims priority from Indian Patent Application No. 2134/CHE/2015, filed Apr. 27, 2015 incorporated herein by reference.

FIELD OF THE INVENTION

The invention relates to a process for converting a biomass or residual waste material into a liquid hydrocarbon material suitable for use as a fuel or as a blending component in a fuel.

BACKGROUND OF THE INVENTION

With increasing demand for liquid transportation fuels, decreasing reserves of 'easy oil' (crude petroleum oil that can be accessed and recovered easily) and increasing constraints on carbon footprints of such fuels, it is becoming increasingly important to develop routes to produce liquid transportation fuels from biomass in an efficient manner. Such liquid transportation fuels produced from biomass are sometimes also referred to as biofuels. Biomass offers a source of renewable carbon. Therefore, when using such biofuels, it may be possible to achieve more sustainable $CO_2$ emissions over petroleum-derived fuels.

An efficient, self-contained method for processing biomass into high quality liquid fuels is described in WO 2010/117437 A1, in the name of Gas Technology Institute. Said method may include one or more of the steps of a) hydropyrolysing biomass in a hydropyrolysis reactor vessel containing molecular hydrogen and a deoxygenating catalyst, producing a mixture of light gases containing predominantly $CO_2$, $H_2O$, CO and $C_1$-$C_3$ gas, vapours containing partially deoxygenated products of hydropyrolysis, char, ash and fines of deoxygenating catalyst; b) removing said char, ash and deoxygenating catalyst fines from said light gases and vapours containing partially deoxygenated products of hydropyrolysis; c) processing the vapours containing partially deoxygenated products of hydropyrolysis in a hydroconversion reactor vessel using a hydroconversion catalyst in the presence of the $H_2O$, $CO_2$, CO and $C_1$-$C_3$ gas generated in step a), producing a substantially fully deoxygenated hydrocarbon liquid and a gaseous mixture comprising CO, $H_2O$, $CO_2$, and light hydrocarbon gases ($C_1$-$C_3$); d) steam reforming a portion of said $C_1$-$C_3$ gaseous mixture, and water-gas shifting the CO, producing molecular hydrogen; and e) introducing said molecular hydrogen into said reactor vessel for hydropyrolysing said biomass, wherein steps a) and c) are operated at conditions under which about 30-70% of oxygen in said biomass is converted to $H_2O$ and about 30-70% of said oxygen is converted to CO and $CO_2$. The reformed hydrogen may then be used in said process as the hydrogen source in step a).

A process for producing liquid hydrocarbons from biomass that utilizes a downstream hydroprocessing reactor and reduced metal catalysts is described in co-pending application PCT/EP2015/051709.

The product from these processes may be further separated to produce diesel fuel, gasoline or blending components for gasoline and diesel fuel.

Different specifications for gasoline and diesel fuel may be required in different locations. Material not meeting these specifications may be used as a blending component in a fuel or may need to be upgraded in order to be used as a blending component or as the fuel itself.

Hydrocarbon liquid products produced from biomass by hydropyrolysis-based processes may not fulfill the specifications required for diesel and gasoline range products in a number of locations. For example, such material may have undesirable distribution of various classes or hydrocarbon molecules (aromatics, paraffins and naphthenes) resulting in, for example, poor octane number of gasoline and poor cetane number of diesel product.

The art of hydropyrolysis, therefore, would benefit significantly from processing options that allow flexibility in terms of providing hydrocarbon-containing product fractions in varying yields and compositions, and with desired product quality attributes (e.g. cold flow properties in the case of a diesel boiling range fraction or octane number in the case of a gasoline boiling range fraction). Such processing options could be adapted as needed to meet changing end-product demands in the art of renewable fuels, thereby maximizing overall value and process economics.

SUMMARY OF THE INVENTION

Accordingly, the present invention provides a process for producing liquid hydrocarbon products from solid biomass and/or residual waste feedstocks, said process comprising the steps of:
a) a first stage of hydropyrolysing the solid feedstock in a hydropyrolysis reactor vessel in the presence of molecular hydrogen and one or more deoxygenation catalysts, producing a product stream comprising partially deoxygenated hydropyrolysis product, $H_2O$, $H_2$, $CO_2$, CO, $C_1$-$C_3$ gases, char and catalyst fines;
b) removing said char and catalyst fines from said product stream;
c) a second stage of hydroconverting said partially deoxygenated hydropyrolysis product in a hydroconversion reactor vessel in the presence of one or more hydroconversion catalysts and of the $H_2O$, $CO_2$, CO, $H_2$, and $C_1$-$C_3$ gases generated in step a), producing a vapour phase product comprising substantially fully deoxygenated hydrocarbon product, $H_2O$, CO, $CO_2$, and $C_1$-$C_3$ gases;
d) condensing the vapour phase product of step d) to provide a liquid phase product comprising substantially fully deoxygenated C4+ hydrocarbon liquid and aqueous material and separating said liquid phase product from a gas phase product comprising $H_2$, CO, $CO_2$, and $C_1$-$C_3$ gases;
e) removing the aqueous material from the substantially fully deoxygenated C4+ hydrocarbon liquid; and
f) a third stage comprising combining an aliphatic hydrocarbon precursor or an aromatic hydrocarbon precursor with at least a portion of the substantially fully deoxygenated C4+ hydrocarbon liquid and co-processing the resultant liquid in a hydroprocessing reactor vessel in the presence of hydrogen and one or more hydroprocessing catalysts.

BRIEF DESCRIPTION OF THE DRAWINGS

FIGS. 1 to 4 show representations of non-limiting embodiments of the process of the invention.

DETAILED DESCRIPTION OF THE INVENTION

Figure 1:
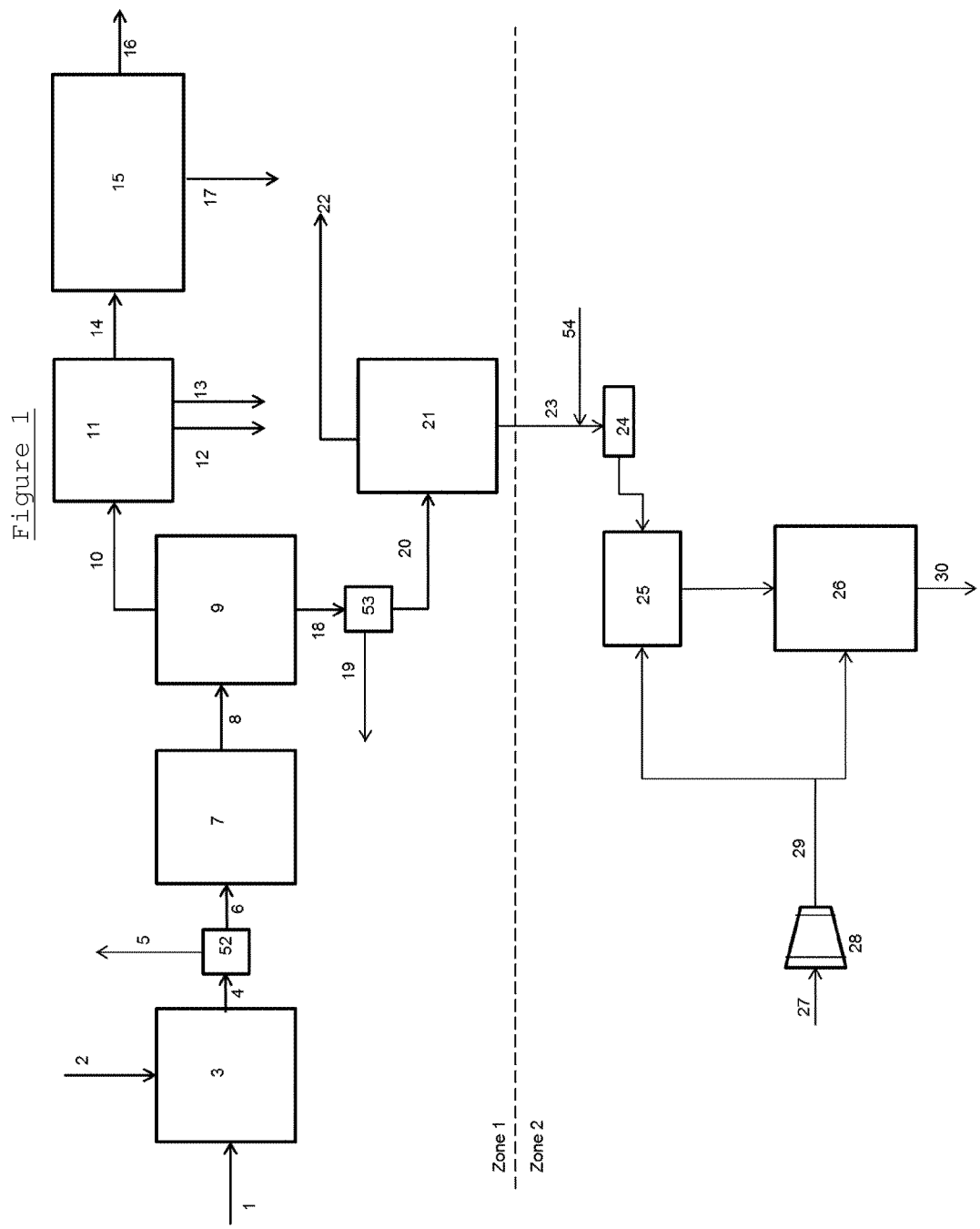

The present inventors have found that the process conditions and/or the product properties of a process for the conversion of solid feedstocks comprising biomass and/or waste plastics to hydrocarbons via hydropyrolysis, hydroconversion and hydroprocessing steps can be enhanced by co-feeding a hydrocarbon precursor to the third stage, comprising at least a hydroprocessing step.

An "enhancement" in a product property refers to a difference or change in the product property, relative to the same product property that is obtained in the absence of co-processing the aliphatic hydrocarbon precursor or aromatic hydrocarbon precursor, in which the difference or change is directionally favorable to achieving a desired operating objective (e.g. an increased yield or increased quality of a given boiling point range fraction of the liquid recovered from the process).

The co-processing of a wide variety of both renewable and non-renewable feedstocks, together with the typical feed to the third stage, may provide a number of advantages, described more fully below. Such advantages may include (i) the ability to process certain aliphatic hydrocarbon precursors or aromatic hydrocarbon precursors and thereby upgrade these feedstocks, often in a manner that achieves operational synergy with the biomass-derived feedstock; (ii) the improvement of product properties, such as cetane number, octane number, etc; (iii) the ability to tailor the product slate of the process to a certain location and market; (iv) the ability to use locally available biomass and non-biomass derived materials, e.g. waste oils, in a process for the use of fungible hydrocarbons; and (v) the ability of certain aliphatic hydrocarbon precursors or aromatic hydrocarbon precursors to facilitate hydrogen production, for example by the steam reforming of propane that is generated as a hydrodeoxygenation reaction product of the glycerol backbone of triglycerides, or by steam reforming of light hydrocarbon gases produced in hydroprocessing of aliphatic hydrocarbon precursors or aromatic hydrocarbon precursors, thereby at least partially satisfying the overall hydrogen requirements of at least part of the overall process.

Hydroprocessing Step and Feedstock

In the first step of the inventive process, a solid feedstock comprising lignocellulose and/or waste plastics and molecular hydrogen are introduced into a reactor vessel containing a deoxygenation catalyst, in which vessel the biomass undergoes hydropyrolysis, producing an output comprising char, partially deoxygenated products of hydropyrolysis, light gases ($C_1$-$C_3$ gases, $H_2O$, $CO$, $CO_2$, and $H_2$) and catalyst fines. Although any type of reactor suitable for hydropyrolysis may be employed, the preferred type of reactor is a bubbling fluidized bed reactor. The fluidization velocity, catalyst particle size and bulk density and biomass particle size and bulk density are chosen such that the catalyst remains in the bubbling fluidized bed, while the char produced gets entrained out of the reactor. The hydropyrolysis step employs a rapid heat up of the biomass feed such that the residence time of the pyrolysis vapours in the reactor vessel is preferably less than about 1 minute, more preferably less than 30 seconds and most preferably less than 10 seconds.

The solid feedstock used in the inventive process comprises a residual waste feedstock and/or a biomass feedstock containing any combination of one or more of lignin, lignocellulosic, cellulosic and/or hemicellulosic material. Lignocellulosic material comprises a mixture of lignin, cellulose and hemicelluloses in any proportion and usually also contains ash and moisture. Such material is typically more difficult to convert into fungible liquid hydrocarbon products than cellulosic and hemicellulosic material. It is an advantage of the present process that it can be used for lignocellulose-containing biomass. Therefore, the solid biomass feedstock used in the inventive process preferably contains lignocellulosic material. Suitable lignocellulose-containing biomass includes woody biomass and agricultural and forestry products and residues (whole harvest energy crops, round wood, forest slash, bamboo, sawdust, bagasse, sugarcane tops and trash, cotton stalks, corn stover, corn cobs, castor stalks, Jatropha whole harvest, Jatropha trimmings, de-oiled cakes of palm, castor and Jatropha, coconut shells, residues derived from edible nut production and mixtures thereof, and municipal solid wastes containing lignocellulosic material. The municipal solid waste may comprise any combination of lignocellulosic material (yard trimmings, pressure-treated wood such as fence posts, plywood), discarded paper and cardboard and waste plastics, along with refractories such as glass, metal. Prior to use in the process of this invention, municipal solid waste may be optionally converted into pellet or briquette form, such pellets or briquettes are commonly referred to as Refuse Derived Fuel in the industry. Certain feedstocks (such as algae and lemna) may also contain protein and lipids in addition to lignocellulose. Residual waste feedstocks are those comprising mainly waste plastics. In a preferred embodiment of the invention, woody biomass, preferably wood, is used as the source of the biomass.

The solid feedstock utilized in the process of this invention may be provided to the hydropyrolysis reactor vessel in the form of loose biomass particles having a majority of particles preferably less than about 3.5 mm in size or in the form of a biomass/liquid slurry. However, it will be appreciated by those skilled in the art that the biomass feed may be pre-treated or otherwise processed in a manner such that larger particle sizes may be accommodated. Suitable means for introducing the biomass feed into the hydropyrolysis reactor vessel include, but are not limited to, an auger, fast-moving (greater than about 5 m/sec) stream of carrier gas (such as inert gases and $H_2$), and constant-displacement pumps, impellers, or turbine pumps. In the most preferred embodiment of the invention, a double-screw system comprising of a slow screw for metering the biomass followed by a fast screw to push the biomass into the reactor without causing torrefaction in the screw housing is used for biomass dosing. An inert gas or hydrogen flow is maintained over the fast screw to further reduce the residence time of the biomass in the fast screw housing.

The hydropyrolysis is suitably carried out in the hydropyrolysis reactor vessel at a temperature in the range of from 350° C. to 600° C. and a pressure in the range of from 0.50 MPa to 7.50 MPa. The heating rate of the biomass is preferably greater than about 100 W/m². The weight hourly space velocity (WHSV) in g(biomass)/g(catalyst)/hr for this step is suitably in the range of from 0.2 $h^{-1}$ to 10 $h^{-1}$, preferably in the range of from 0.3 $h^{-1}$ to 3 $h^{-1}$.

The hydropyrolysis step may operate at a temperature hotter than is typical of conventional hydroprocessing processes familiar to those skilled in the state-of-the-art of hydrotreating and hydrocracking of petroleum-derived fractions, as a result of which the biomass is rapidly devolatilized. Thus, in a preferred embodiment, the step includes the use of an active catalyst to stabilize the hydropyrolysis vapours, but not so active that it rapidly cokes.

Catalyst particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

Any deoxygenation catalyst suitable for use in the temperature range of this process may be employed in the hydropyrolysis step. Preferably, the catalyst is selected from sulfided catalysts comprising one or more metals from the group consisting of nickel, cobalt, molybdenum or tungsten supported on a metal oxide. Suitable metal combinations include sulfided NiMo, sulfided CoMo, sulfided NiW, sulfided CoW and sulfided ternary metal systems comprising any 3 metals from the family consisting of Ni, Co, Mo and W. Monometallic catalysts such as sulfided Mo, sulfided Ni and sulfided W are suitable for use as well. Most preferred metal combinations for the deoxygenation catalyst are sulfided NiMo and sulfided CoMo.

Metal oxides useful as supports for the sulfided metal catalysts include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalized fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the deoxygenation catalyst are preferably in the range of from 1.5 wt % to 35 wt % (expressed as a weight percentage of calcined catalyst in oxidic form, e.g. weight percentage of nickel (as NiO) and molybdenum (as $MoO_3$) on calcined oxidized NiMo on alumina catalyst). Additional elements such as phosphorous may be incorporated into the catalyst to improve the dispersion of the metal.

The first stage of the inventive process produces a partially deoxygenated hydropyrolysis product. The term 'partially deoxygenated' is used herein to describe material in which at least 30 wt %, preferably at least 50 wt %, more preferably at least 70 wt % of the oxygen present in the original lignocelluloses-containing biomass has been removed. The extent of oxygen removal here refers to the percentage of the oxygen in the biomass feedstock, excluding that contained in the free moisture in the feedstock. This oxygen is removed in the form of $H_2O$, CO and $CO_2$ in the hydropyrolysis step. Although it is possible that nearly 100 wt % of the oxygen present in the original biomass is removed, typically at most 99 wt %, suitably at most 95 wt % will be removed in the hydropyrolysis step.

Char Removal

In between the hydropyrolysis and hydroconversion steps, char and catalyst fines are typically removed from the partially deoxygenated hydropyrolysis product. Any ash present will also normally be removed at this stage. The most preferred method of char and catalyst fines removal from the vapour stream is by cyclone separation. Solid separation equipment (e.g. cyclones) may also be used internal to the hydropyrolysis reactor (above a dense bed phase) to prevent the entrainment of solid particles above a certain particle size.

Char may also be removed in accordance with the process of this invention by filtration from the vapour stream, or by way of filtering from a wash step—ebullated bed. Back-pulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilized the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is the high boiling point portion of the finished oil from this process and is thus a fully saturated (hydrogenated), stabilized oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase.

Inert graded bed materials may also be used to remove the char and catalyst fines from the vapour stream.

In accordance with another embodiment of this invention, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the first reaction stage, which is typically less than 200 mesh (smaller than 70 micrometers).

Any ash and catalyst fines present may also be removed in the char removal step.

Second Stage

After removal of the char, the partially deoxygenated hydropyrolysis product together with the $H_2$, CO, $CO_2$, $H_2O$, and $C_1$-$C_3$ gases from the hydropyrolysis step are introduced into a hydroconversion reactor vessel and subjected to a hydroconversion step. The hydroconversion is suitably carried out at a temperature in the range of from 300° C. to 600° C. and a pressure in the range of from 0.50 MPa to 7.50 MPa. The weight hourly space velocity (WHSV) for this step is in the range of about $0.1\ h^{-1}$ to about $2\ h^{-1}$.

The hydroconversion catalyst used in this step is protected from Na, K, Ca, P, and other metals present in the biomass which may otherwise poison the catalyst, since these metals are predominantly removed with the char and ash products of the first hydropyrolysis stage, which are separated from the partially deoxygenated hydropyrolysis product, prior to subjecting this product to hydroconversion. This hydroconversion catalyst is, therefore, advantageously protected from olefins and free radicals by the upgrading achieved in the first reaction stage step.

Any hydroconversion catalyst suitable for use in the temperature range of this process may be employed in the hydroconversion step. Preferably, the catalyst is selected from sulfided catalysts comprising one or more metals from the group consisting of nickel, cobalt, molybdenum or tungsten supported on a metal oxide. Suitable metal combinations include sulfided NiMo, sulfided CoMo, sulfided NiW, sulfided CoW and sulfided ternary metal systems comprising any three metals from the family consisting of Ni, Co, Mo and W. Catalysts such as sulfided Mo, sulfided Ni and sulfided W are suitable for use as well.

Metal oxides useful as supports for the sulfided metal catalysts include alumina, silica, titania, ceria, zirconia, as well as binary oxides such as silica-alumina, silica-titania and ceria-zirconia. Preferred supports include alumina, silica and titania. The most preferred support is alumina.

The support may optionally contain regenerated and revitalized fines of spent hydrotreating catalysts (e.g. fines of CoMo on oxidic supports, NiMo on oxidic supports and fines of hydrocracking catalysts containing NiW on a mixture of oxidic carriers and zeolites). Total metal loadings on the catalyst are preferably in the range of from 5 wt % to 35 wt % (expressed as a weight percentage of calcined catalyst in oxidic form, e.g. weight percentage of nickel (as NiO) and molybdenum (as $MoO_3$) on calcined oxidized NiMo on alumina catalyst). Additional elements such as phosphorous may be incorporated into the catalyst to improve the dispersion of the metal. Metals can be introduced on the support by impregnation or co-mulling or a combination of both techniques.

The hydroconversion catalyst used in the hydroconversion step may be, in composition, the same as or different to the deoxygenation catalyst used in the hydropyrolysis step. In one particularly preferred embodiment of the invention, the hydropyrolysis catalyst comprises sulfided CoMo on alumina support and the hydroconversion catalyst comprises sulfided NiMo on alumina support.

After the hydroconversion step, the vapour phase product of step c) is condensed to provide a liquid phase product comprising substantially fully deoxygenated C4+ hydrocarbon liquid and aqueous material. The remaining vapour phase comprises mainly $H_2$, CO, $CO_2$ and light hydrocarbon gases (typically $C_1$ to $C_3$, but this stream may also contain some $C_{4+}$ hydrocarbons) and is separated.

This remaining vapour phase may be sent to a gas clean-up system to remove $H_2S$, ammonia and trace amounts of organic sulfur-containing compounds, if present as by-products of the process. The stream containing CO, $CO_2$, $H_2$ and light hydrocarbons may then be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process.

The liquid phase product is then separated in order to remove the aqueous material, suitably by phase separation, and to provide the substantially fully deoxygenated C4+ hydrocarbon liquid.

The term 'substantially fully deoxygenated' is used herein to describe material in which at least 90 wt %, preferably at least 95 wt %, more preferably at least 99 wt % of the oxygen present in the original lignocellulose containing biomass has been removed. The resulting hydrocarbon liquid contains less than 2 wt %, preferably less than 1 wt %, and most preferably less than 0.1 wt % oxygen.

Third Stage and Co-Feeding

At least a portion of the substantially fully deoxygenated C4+ hydrocarbon liquid is then combined with an aliphatic hydrocarbon precursor or an aromatic hydrocarbon precursor and the resultant liquid is co-processed in at least a hydroprocessing step in a hydroprocessing reactor vessel in the presence of one or more hydroprocessing catalysts. After combination, the stream resulting from the combination of at least a portion of the substantially fully deoxygenated C4+ hydrocarbon liquid and the aliphatic hydrocarbon precursor or aromatic hydrocarbon precursor preferably provides a liquid feed to the one or more reactor vessels in the third stage. In one embodiment, therefore, the hydrocarbon precursor is liquid at ambient pressure and at a temperature in the range of from ambient temperature to 100° C. In a further embodiment, the aliphatic hydrocarbon precursor or aromatic hydrocarbon precursor may be dissolved or blended into the substantially fully deoxygenated C4+ hydrocarbon liquid to form a liquid feed stream.

Optionally, before the hydroprocessing step, the substantially fully deoxygenated C4+ hydrocarbon liquid is subjected to distillation in order to separate the substantially fully deoxygenated C4+ hydrocarbon liquid into fractions according to ranges of the boiling points of the liquid products contained therein. A hydroprocessing step may then be applied to all or some of these fractions. The aliphatic hydrocarbon precursor or aromatic hydrocarbon precursor may be combined with and co-processed with any, all or some of the fractions subjected to the hydroprocessing step.

Also, optionally, before the hydroprocessing reactor, the third stage of the process may also comprise a hydrotreating reactor. Said hydrotreating reactor will typically contain one or more catalysts capable of hydrodesulfurisation and/or hydrodeoxygenation of the feed provided thereto in the presence of hydrogen. In a preferred embodiment of the invention, the aliphatic hydrocarbon precursor or aromatic hydrocarbon precursor is combined with at least a fraction of the substantially fully deoxygenated C4+ hydrocarbon liquid and the resultant liquid stream is provided to the hydrotreating reactor. The two feeds are then co-processed in the hydrotreating reactor before being co-processed in the hydroprocessing reactor. Suitable hydrotreating catalysts are known in the art and include sulfided NiMo or sulfided CoMo on oxidic support. Examples of oxidic supports include alumina, silica, titania, silica-alumina. A preferred catalyst for hydrotreating of the combined feed is a sulfided CoMo supported on alumina support.

An aliphatic hydrocarbon precursor is a feedstock, other than the solid biomass and/or residual waste feedstocks, as defined above, although the aliphatic hydrocarbon precursor may itself be of a biological (rather than mineral or petroleum-based) origin. The aliphatic hydrocarbon precursor, when subjected to processing in the hydroprocessing reactor, yields a greater percentage of aliphatic (e.g. paraffinic) hydrocarbons relative to aromatic hydrocarbons, based on the weight of the aliphatic hydrocarbon precursor introduced into the process.

Representative aliphatic hydrocarbon precursors include triglyceride-containing components, for example naturally occurring plant (e.g. vegetable) oils and animal fats, or mixtures of such oils and fats (e.g. waste restaurant oils or grease) as well as crude tall oil from pulp and paper production, mono- and diglycerides, free fatty acids, alkyl esters of fatty acids and greases. Advantageously, the greenhouse gas (GHG) emissions associated with many of these components (as co-feeds) are considered negligible, as these biofuel sources are otherwise normally waste products already produced for human and animal consumption. As understood in the art, calculated GHG emissions are based on a lifecycle assessment (LCA) from the time of cultivation of the feedstock sources (in the case plant oils), up to and including the ultimate combustion of the liquid products, obtained from processing these feedstocks. Triglyceride-containing components typically contain both free fatty acids and triglycerides, with the possible additional presence of monoglycerides and diglycerides. Triglyceride-containing components may also include those containing derivative classes of compounds such as fatty acid alkyl esters (FAAE), which embrace fatty acid methyl esters (FAME) and fatty acid ethyl esters (FREE).

Examples of plant oils include rapeseed (including canola) oil, corn oil, colza oil, crambe oil, sunflower oil, soybean oil, hempseed oil, olive oil, linseed oil, mustard oil, palm oil, peanut oil, castor oil, coconut oil, jatropha oil, camelina oil, cottonseed oil, salicornia oil, pennycress oil, algal oil, and other nut oils, and mixtures thereof. In a preferred embodiment of the invention, waste cooking oil, such as vegetable oil already used, for example in the food industry is used in the process of the present invention.

Examples of animal fats include lard, offal, tallow, train oil, milk fat, fish oil, sewage sludge, and/or recycled fats of the food industry. Mixtures of one or more of these animal fats and one or more of these plant oils may also be used as an aliphatic hydrocarbon precursor. The triglycerides and free fatty acids of a typical plant oil, animal fat, or mixtures thereof, may include aliphatic hydrocarbon chains in their structures, as described above, with the majority of these chains having from about 8 to about 24 carbon atoms. Representative plant oils and/or animal fats, used as a triglyceride-containing component, may include significant proportions (e.g. at least about 30%, or at least about 50%) of aliphatic (e.g. paraffinic or olefinic) hydrocarbon chains with 16 and 18 carbon atoms. Triglyceride-containing components may be liquid or solid at room temperature. However, as indicated above, the hydrocarbon precursors used in the process of the present invention are, preferably, liquid at ambient pressure and at a temperature in the range of from ambient temperature to 100° C.

Other suitable aliphatic hydrocarbon precursors include algal oils and algal lipids.

An "aromatic hydrocarbon precursor" is a feedstock other than the biomass-containing feedstock, as defined above, although the aromatic hydrocarbon precursor may itself be of a biological (rather than mineral or petroleum-based) origin. The aromatic hydrocarbon precursor, when subjected to processing in the hydroprocessing reactor vessel and/or the hydroconversion reaction zone, yields a greater percentage of aromatic hydrocarbons (e.g. alkylbenzenes) relative to aliphatic hydrocarbons, based on the weight of the aromatic hydrocarbon precursor introduced into the process. An aromatic hydrocarbon precursor is particularly useful in co-processing, for enhancing the yield of a gasoline boiling point range fraction or a non-turbine aviation fuel boiling point range fraction of the deoxygenated hydrocarbon liquid and/or increasing the octane number of this fraction. Suitable aromatic hydrocarbon precursors, include, but are not limited to, pyrolysis gasoline (pygas), FCC gasoline, coker naphtha and oxygenated hydrocarbons derived from lignin depolymerisation.

The substantially fully deoxygenated C4+ hydrocarbon liquid comprises naphtha range hydrocarbons, middle distillate range hydrocarbons and vacuum gasoil (VGO) range hydrocarbons, which can be separated by distillation. For the purpose of clarity, middle distillates here are defined as hydrocarbons or oxygenated hydrocarbons recovered by distillation between an atmospheric-equivalent initial boiling point (IBP) and a final boiling point (FBP) measured according to standard ASTM distillation methods. ASTM D86 initial boiling point of middle distillates may vary from 150° C. to 220° C. Final boiling point of middle distillates, according to ASTM D86 distillation, may vary from 350° C. to 380° C. Naphtha is defined as hydrocarbons or oxygenated hydrocarbons having four or more carbon atoms and having an atmospheric-equivalent final boiling point that is greater than 90° C. but less than 200° C. A small amount of hydrocarbons produced in the process (typically less than 3 wt % of total C4+ hydrocarbons, and preferably less than 1 wt % of total C4+ hydrocarbons) boil at temperatures higher than those for the middle distillates as defined above, i.e. they are hydrocarbons with boiling range similar to vacuum-gas oil produced by distillation of petroleum.

Gasoline is an automotive fuel comprising predominantly of naphtha-range hydrocarbons, used in spark-ignition internal combustion engines. In the United States, ASTM D4814 standard establishes the requirements of gasoline for ground vehicles with spark-ignition internal combustion engines.

Diesel is an automotive fuel comprising predominantly of middle-distillate range hydrocarbons, used in compression-ignition internal combustion engines. In the United States, ASTM D975 standard covers the requirements of several grades of diesel fuel suitable for various types of diesel engines.

An advantage of the present invention is that under suitable operating conditions, the substantially fully deoxygenated C4+ hydrocarbon liquid produced from lignocellulose-containing biomass is substantially fully free from oxygen, sulfur and nitrogen. Preferably, the oxygen content of this product is less than 1.50 wt % and more preferably less than 0.50 wt %, and most preferably less than 0.10 wt %. The sulfur content is preferably less than 100 ppmw, more preferably less than 10 ppmw, and most preferably less than 5 ppmw. The nitrogen content is preferably less than 1000 ppmw, more preferably to less than 100 ppmw and most preferably to less than 10 ppmw.

The third stage comprising the hydroprocessing step is carried out on the liquid stream resulting from the combination of an aliphatic hydrocarbon precursor or an aromatic hydrocarbon precursor with at least a portion of the substantially fully deoxygenated C4+ hydrocarbon liquid. This portion of the substantially fully deoxygenated C4+ hydrocarbon liquid may comprise the entire range of material within the substantially fully deoxygenated C4+ hydrocarbon liquid separated from the aqueous material, or may comprise one or more of the fractions separated out of the substantially fully deoxygenated C4+ hydrocarbon liquid by distillation. Alternatively, more than one fraction separated out of the substantially fully deoxygenated C4+ hydrocarbon liquid by distillation may be subjected to the third stage comprising a hydroprocessing step separately or after re-combination of two or more of the fractions. For example, after distillation, the naphtha range fraction of hydrocarbons and/or the middle distillate range fraction of hydrocarbons may be subjected to the third stage comprising the hydroprocessing step. Alternatively, the third stage comprising the hydroprocessing step may be applied to at least a portion of the entire substantially fully deoxygenated C4+ hydrocarbon liquid before it is subjected to distillation.

Further, also alternatively, the third stage comprising a hydroprocessing step may be applied to a stream comprising one or more of the fractions separated out of the substantially fully deoxygenated C4+ hydrocarbon liquid by distillation, with the fraction subjected to hydroprocessing then combined with one or more other fractions.

As stated previously, the aliphatic hydrocarbon precursor or aromatic hydrocarbon precursor may be combined with and co-processed with any, all or some of the fractions subjected to the third stage comprising a hydroprocessing step and, optionally, the hydrotreating step.

After combining the fractions or after hydroprocessing of combined fractions, the combined mixture may then be subjected to one or more further distillation steps.

For example, a benzene-rich fraction of C4+ hydrocarbon liquid may be combined with middle distillate range fraction of C4+ hydrocarbon liquid. The combined fraction may then be combined with the aliphatic hydrocarbon precursor or aromatic hydrocarbon precursor and subjected to hydroprocessing. After hydroprocessing, the combined products may be subjected to one or more distillations and blended in a suitable manner with fractions of C4+ hydrocarbon liquid that are not subjected to hydroprocessing, in order to produce gasoline and diesel product that meet specifications for gasoline and/or diesel, including one or more of the product specifications described herein, in one or more locations in the world.

As discussed above, a third stage comprising a hydroprocessing step, including co-processing one or more aliphatic or aromatic hydrocarbon precursors in at least the hydroprocessing step, may be beneficial to provide an upgraded (hydrogenated) product having, relative to the feed, (i) a reduced total aromatics content, (ii) a reduced benzene content (e.g. as a result of selective saturation), (iii) a reduced sulphur and/or nitrogen content, (iv) an increased cetane number for the diesel fraction of upgraded product, (v) a reduced density, (vi) an increased octane number for the gasoline fraction of upgraded product or any combination of (i)-(vi).

In representative embodiments, for example, the upgraded product obtained from the hydroprocessing step in which one or more aliphatic or aromatic hydrocarbon precursors is co-processed may be reduced in total aromatics content, and/or benzene, relative to the feed, (i.e. the hydroprocessing step may achieve a total aromatics conversion level, and/or a benzene conversion level) of generally at least about 40% (e.g. from about 40% to about 99%), typically at least about 50% (e.g. from about 50% to about 99%), and often at least about 60% (e.g. from about 60% to about 99%). Such total aromatics conversion levels, and/or benzene conversion levels may be achieved with representative feeds having a total, starting aromatics content of at least about 40%, at least about 70%, or at least about 80%, by weight.

While representative feeds to the hydroprocessing step may have these contents of total aromatics by weight, or, according to alternative embodiments, these levels of total benzene by weight, regardless of the aromatics conversion level achieved, such feeds may also, or alternatively, have relatively a low total sulphur content, particularly when compared to diesel boiling range hydrocarbon fractions obtained from conventional refining processes (e.g. crude oil fractionation), prior to final upgrading. Low sulphur levels in the feed can be a result of the low sulphur content of the starting biomass and/or a result of upstream processing steps, described above (e.g. hydroconversion), which can serve to reduce the level of sulphur present in the substantially fully deoxygenated C4+ hydrocarbon liquid. Representative feeds may have a total sulphur content, for example, of generally less than about 100 parts per million by weight (wt-ppm), typically less than about 50 wt-ppm, and often less than about 10 wt-ppm. Representative feeds may, in combination with the contents of total aromatics, total benzene, and/or total sulphur described above, or may alternatively, have a total nitrogen content of generally less than about 500 wt-ppm, typically less than 200 wt-ppm, and often less than about 100 wt-ppm. Representative conversion levels of total sulphur and/or total nitrogen in the hydroprocessing step may be at least about 50%, at least about 65%, or at least about 85%.

In further representative embodiments, the upgraded product may have a cetane number that is increased by at least about 5, at least about 7, or at least about 10, relative to those of the feeds. Accordingly, the upgraded product may be ignitable in a compression ignition internal combustion engine, whereas one or more of the feeds may not have this desired property.

In other representative embodiments, the upgraded product may have an octane number that is increased by at least 1.5, at least about 3, or at least about 4 units relative to those of the feeds.

In other representative embodiments, the upgraded product may have a density that is reduced by at least about 0.02 g/ml, at least about 0.04 g/ml, or at least about 0.07 g/ml, relative to those of the feeds. Further properties of the upgraded product include compliance with regulatory standards for gasoline and diesel fuel products, including diesel fuel aromatics content and sulphur standards in Europe and North America (e.g. compliance with the aromatic specification of ASTM D975 No. 1 and No. 2 diesel in North America).

The hydroprocessing reactor contains one or more catalysts which are preferably each in the form of at least one reduced metal supported on a solid support. 'Reduced metal' as used herein refers to its normal meaning: that the metal is in a zero oxidation state.

In one embodiment of the invention, preferable metals present on at least one of the one or more catalysts include nickel, platinum, palladium and ruthenium or a combination of one or more of these metals. The metal loading for nickel containing catalysts preferably varies from 1 wt % to 70 wt % expressed as a percentage of calcined, oxidic catalyst. For noble-metal containing catalysts (platinum, palladium, ruthenium, rhodium), the loading preferably varies from 0.05 wt % to 3 wt % expressed as a percentage of calcined, oxidic catalyst. Suitable supports in this embodiment include metal oxides such as silica, alumina, mixed silica-alumina, titania, ceria, zirconia and mixed ceria-zirconia, activated carbon and mesoporous carbon. Such catalysts have the advantageous property of promoting nearly 100% saturation of aromatics in the feed without causing a significant shift in the boiling range of the hydrocarbon liquid treated. Preferably, the amount of hydrocarbon liquid that is converted from diesel range to gasoline range is less than 10 wt %.

In a second embodiment of the invention, preferable metals present on at least one of the one or more catalysts include nickel, platinum, palladium, ruthenium and rhodium or a combination of one or more of these metals. The metal loading for nickel containing catalysts preferably varies from 1 wt % to 70 wt % expressed as a percentage of calcined, oxidic catalyst. For noble-metal containing catalysts (platinum, palladium, rhodium and ruthenium), the loading preferably varies from 0.05 wt % to 3 wt % expressed as a percentage of calcined, oxidic catalyst. Suitable solid oxide supports in this embodiment include metal oxides or mixtures thereof with higher levels of acidity. Such supports include amorphous silica-alumina, zeolites and combinations thereof with other oxides such as silica, alumina, titania, ceria and zirconia or with activated carbon or mesoporous carbon. ASA carriers may be modified with base metals such as boron, lithium, bismuth, magnesium, zinc, zirconium or with phosphorus. Such catalysts have the advantageous property of promoting saturation of aromatics in the feed and of promoting hydrocracking of heavier hydrocarbons in the feed.

In a third embodiment of the invention, preferable metals present on at least one of the one or more catalysts are selected from systems containing nickel, platinum, palladium, iridium, ruthenium and rhodium. Bimetallic systems, for example PtIr, PdIr, NiIr supported on metal oxides and carbons may be used as well. The metal loading for nickel containing catalysts preferably varies from 1 wt % to 70 wt % expressed as a percentage of calcined, oxidic catalyst. For noble-metal containing catalysts (platinum, palladium, iridium, ruthenium and rhodium), the total metal loading preferably varies from 0.05 wt % to 3 wt % expressed as a percentage of calcined, oxidic catalyst. Suitable supports include metal oxides such as silica, alumina, titania, supports with mild basicity such as ceria, zirconia, mixed ceria-zirconia, magnesia, cupric oxide, hydrotalcites and spinels, mildly acidic materials such as amorphous silica-alumina (ASA) and zeolites with high $SiO_2$:$Al_2O_3$ ratio (>20). ASA carriers may be modified with base metals such as boron, lithium, bismuth, magnesium, zinc, zirconium or with phosphorus. Such catalysts have the advantageous property of promoting saturation of aromatics in the feed and of opening naphthenic or aromatic ring of cyclic molecules in the feed.

Optionally, catalysts from more than one of the 3 previously described embodiments (i.e. catalysts that are (i) catalysts that are particularly suitable wherein high amounts of aromatic saturation are required; (ii) catalysts that are particularly suitable wherein mild hydrocracking is required; and (iii) catalysts that are particularly suitable wherein high amounts of ring opening are required) are used in the hydroprocessing reactor in which one or more aliphatic or aromatic hydrocarbon precursors is co-processed. When more than one catalyst is used, these may be present in a mixed catalyst bed, as a stacked catalyst bed or within different reactor vessels within the hydroprocessing reactor system. It is also envisaged that a single catalyst may be used which acts in more than one of these mechanisms (aromatic saturation, mild hydrocracking and ring opening).

Reduced metal hydroprocessing catalysts as described above are sensitive to sulphur. Therefore, as indicated previously, a separate hydrotreating reactor containing a catalyst capable of hydrodesulfurisation (HDS) (and, optionally hydrodeoxygenation) may be used and the feed to the hydroprocessing reactor may be provided to the hydrotreating reactor prior to being subjected to hydroprocessing.

Alternatively, a sulphur guard bed may be present before the hydroprocessing catalyst in the hydroprocessing reactor vessel. This may also be beneficial if the aliphatic or aromatic hydrocarbon precursor feed contains increased levels of sulfur. In this embodiment of the invention, materials suitable as a sulfur guard bed include highly dispersed metals or metal oxides on an oxidic support. Examples of oxidic support include silica, alumina, and mixed silica-alumina. Suitable metals dispersed on oxidic support include nickel, iron, and copper. Suitable metal oxides dispersed on oxidic support include ferric oxide, zinc oxide and cupric oxide. Suitable loadings of active metal or metal oxide on the support range from 2 wt % to 70 wt % based on calcined, oxidic form of the trap material.

In a further embodiment of the invention, the material used as the sulphur guard bed may be the same material as the hydroprocessing catalyst. In this embodiment, the sulphur guard bed material may be present as a separate bed or as a sacrificial portion of the hydrogenation catalyst bed. A separate bed of sulphur guard bed material or sacrificial hydrogenation catalyst may be used in a separate reactor that is easily removed from service once it becomes spent (e.g. sulphur breakthrough is detected) or almost spent, allowing a fresh bed to be placed in service simultaneously with, or shortly after, removal of the spent or almost spent bed from service. A swing-bed system with appropriate valve and piping connections may be suitable for this objective.

In one exemplary embodiment, a stacked bed hydroprocessing reactor may be used in which at least a portion of the substantially fully deoxygenated C4+ hydrocarbon liquid is contacted with a sulphur guard bed and then one or more hydroprocessing catalysts in turn.

The hydroprocessing step, including the sulphur guard bed, if present, is suitably carried out in the reactor vessel at a temperature in the range of from 100° C. to 450° C. and a pressure in the range of from 0.3 MPa to 15.1 MPa. The weight hourly space velocity (WHSV) in g(feed)/g(catalyst)/hr for this step is suitably in the range of from 0.1 $h^{-1}$ to 2.5 $h^{-1}$. As indicated above, preferably, the aliphatic or aromatic hydrocarbon precursors is liquid at ambient pressure and at a temperature in the range of from ambient temperature to 100° C.

Hydroprocessing reactions are exothermic, and as is known to those skilled in the state of the art, require quench to avoid generation of excessive temperatures in the reactor. Such excessive temperatures are undesirable, as they inhibit aromatic saturation reactions, and promote coking. Further, excessive temperature may damage the catalyst and cause its deactivation. As those skilled in the art will recognize, either a liquid quench using recycled product liquid combined with fresh feed, or a gas quench using hydrogen injection at one or more locations in the hydroprocessing bed, or a combination of both strategies, may be employed to manage the exotherm. When a liquid quench is used, the weight hourly space velocity above is calculated on the basis of fresh feed alone.

DETAILED DESCRIPTION OF THE DRAWINGS

FIG. 1 shows an embodiment of the invention.

Feedstock containing the lignocellulosic material 1 is contacted with a hydrogen-containing gaseous stream 2 in hydropyrolysis reactor 3 containing hydropyrolysis catalyst. This reactor is a bubbling fluidized bed reactor. The product 4 of this reactor is a mixed solid and vapour phase product containing hydrogen, light gases ($C_1$-$C_3$ hydrocarbons, CO, $CO_2$, $H_2S$, ammonia, water vapour), vapours of C4+ hydrocarbons and oxygenated hydrocarbons. Char, ash and catalyst fines are entrained with the vapour phase product. A solid separator 52 separates char, ash and catalyst fines 5 from the vapour phase product 6. The vapour phase product 6 then enters the catalytic hydroconversion reactor 7. This reactor is a fixed bed reactor. The product 8 of this reactor contains light gaseous hydrocarbons (methane, ethane, ethylene, propane, and propylene), naphtha range hydrocarbons, middle-distillate range hydrocarbons, hydrocarbons boiling above 370° C. (based on ASTM D86), hydrogen and by-products of the upgrading reaction such as $H_2O$, $H_2S$, $NH_3$, CO and $CO_2$. The vapours are condensed in one or more condensers followed by gas-liquid separators 9 downstream of the catalytic hydroconversion reactor 7 and a liquid product 18 is recovered. The non-condensable gases 10 are sent to a gas clean-up system 11, comprising one or more process units, to remove a $H_2S$ stream 12 and ammonia stream 13 as by-products of the process. Organic sulfur containing compounds may be removed in the gas clean-up system as well. The stream containing light hydrocarbons 14 is sent to a separation, reforming and water-gas shift section 15 of the process, where hydrogen 16 is produced from the light gases and renewable $CO_2$ is discharged as a by-product of the process 17. A fuel gas stream may be recovered as a by-product from this section as well. The hydrogen 16 produced in section 15 of the process may be recycled to the hydropyrolysis reactor 3. The quantity of hydrogen stream 16 produced in section 15 is equal to or greater than the hydrogen required to maintain fluidisation and sustain chemical consumption of hydrogen in the process.

The liquid product 18 recovered from the condensation and gas-liquid separation system 9 is sent to a product recovery section 53, where the aqueous product 19 is separated from the hydrocarbon liquid product 20. The hydrocarbon liquid product 20 is then sent for distillation 21 to recover gasoline product 22 and a middle-distillate product 23. If desired, kerosene/jet fuel and diesel may be recovered as separate streams from the distillation tower.

A stream 54 containing one or more aliphatic or aromatic hydrocarbon precursors is mixed with the middle-distillate product 23 and the mixed stream is provided to a hydrotreating reactor 25 and subsequently to a fixed-bed hydroprocessing reactor 26 for upgrading the middle distillate fraction 23 recovered by the distillation 21 of the hydrocarbon product 20 of the hydroconversion reactor 7. A pump 24 is used to provide this stream to the reactor.

A stream of hydrogen 27 is compressed in a compressor 28 in order to provide a hydrogen stream 29 at a pressure that is similar to or higher than the pressure at which the reactors (3, 7) in zone 1 operate. Said hydrogen stream is supplied to both the hydrotreating reactor 25 and the hydroprocessing reactor 26. An upgraded product stream 30 is recovered from the hydroprocessing reactor.

The product of the third stage suitably has improved attributes of quality of lower aromatic content, lower density, higher hydrogen content, and higher cetane number, when compared to the middle distillate fraction 23. A gas stream separated from this liquid product may be recycled to the hydrogenation reactor or sent to the gas clean-up system.

Figure 2:
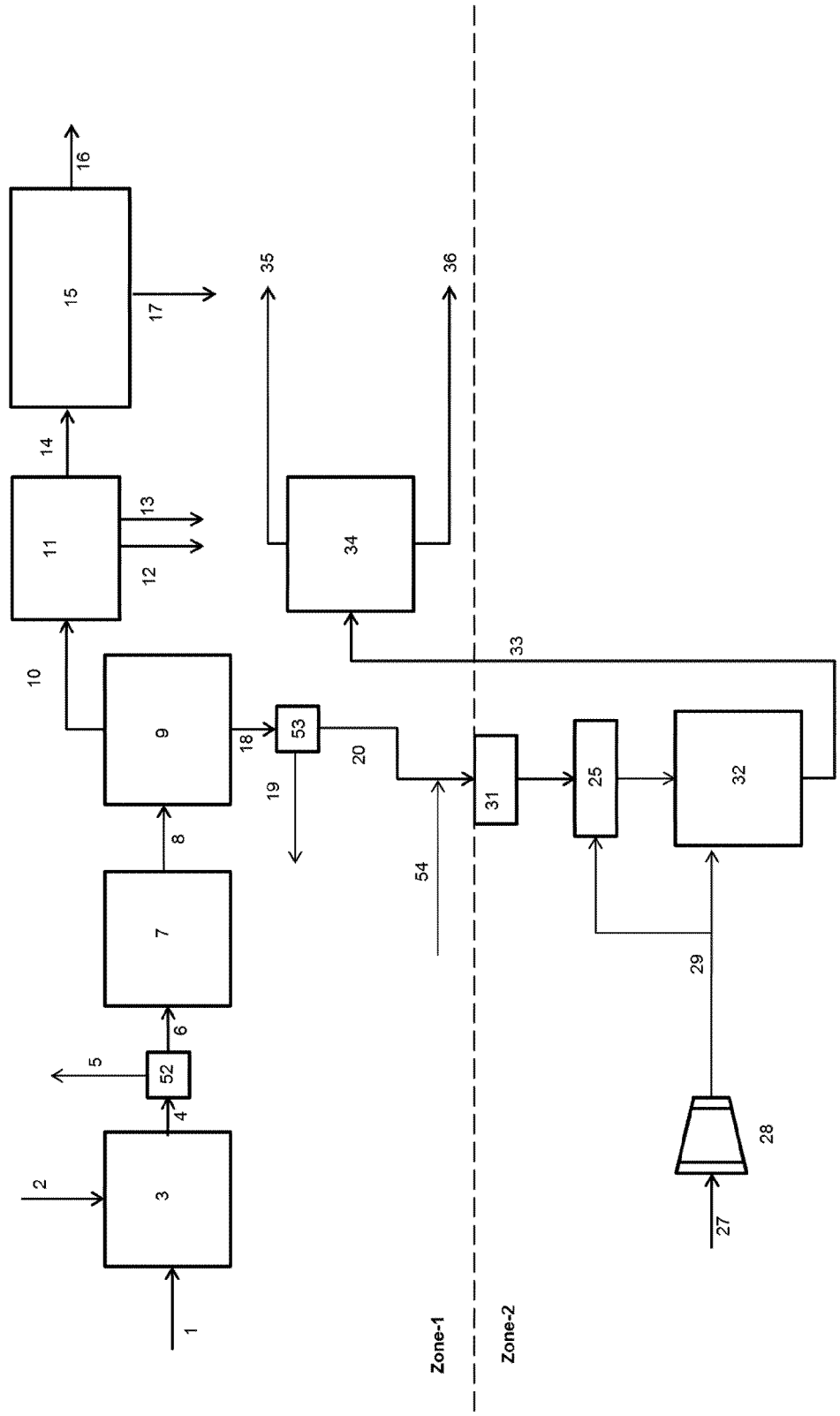

A further embodiment of the invention is shown in FIG. 2. A process similar to that shown in zone 1 of FIG. 1 is followed. However, the hydrocarbon liquid product 20 is in this embodiment not fed to a distillation set-up, but is instead combined with stream 54 containing one or more aliphatic or aromatic hydrocarbon precursors and is the combined stream is then passed via a pump 31 to the third stage comprising hydrotreating reactor 25 and a hydroprocessing reactor 32 in both of which it is contacted with a pressurised hydrogen feed 29. The product 33 of the fixed-bed hydroprocessing reactor 32 is then sent for distillation 34 to recover a gasoline product 35 and a middle distillate product 36.

This embodiment of the invention has the added advantage that the gasoline fraction may also be subjected to upgrading, e.g. to reduce benzene to meet regulatory specifications, before distillation.

Figure 3:
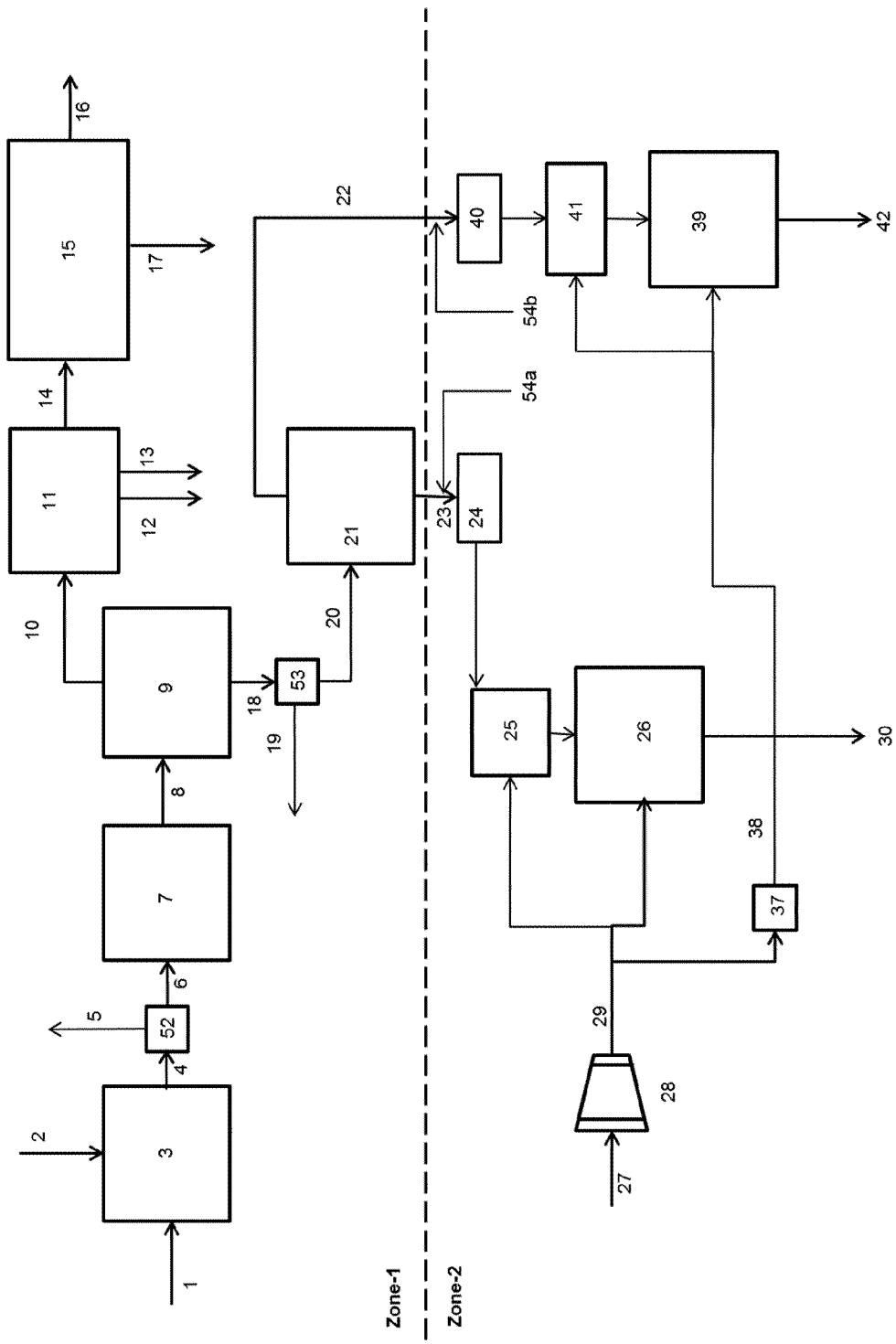

Another embodiment of the invention is shown in FIG. 3. In this embodiment, the middle distillate fraction is processed in the same manner as in FIG. 1. Stream 54 is indicated as 54a in FIG. 3. However, following distillation, the gasoline fraction 22 is combined with stream 54b containing one or more aliphatic or aromatic hydrocarbon precursors and then passed through a pump 40 and the combined streams are co-processed in a hydrotreating reactor 41 and a hydroprocessing reactor 39. In both reactors the combined stream is reacted with a hydrogen stream 38 in the presence of a catalyst to provide upgraded gasoline stream 42. In this embodiment, compressor 28 may represent one compressor or two or more compressors in series or in parallel.

It will be readily envisaged that streams 54a and 54b in this embodiment should contain aliphatic or aromatic hydrocarbon precursors tailored to the requirements of the specific reactors and may be the same or different.

FIG. 4 exemplifies one embodiment of the invention described herein. The embodiment shown in FIG. 4 includes the same steps as shown in FIG. 1.

However, also in this embodiment, the gasoline product 22, is subjected to a further distillation 62, to produce a benzene rich gasoline stream 55 and a benzene lean gasoline stream 56.

The benzene rich gasoline stream 55 is combined with stream 23 and a stream 54 containing one or more aliphatic or aromatic hydrocarbon precursors and a pump 24 is used to provide the combined stream to the hydrotreating reactor 25 and then the hydroprocessing reactor 26. A stream of hydrogen 27 is compressed in a compressor 28 in order to provide hydrogen streams 29 and 58 at a pressure that is similar to or higher than the pressure at which the reactors (3, 7) in zone 1 operate. An upgraded product stream 30 is recovered from the hydroprocessing reactor 26.

The upgraded product stream 30 may then be subjected to distillation 57 to provide an upgraded middle distillate fraction 58 and an upgraded gasoline fraction 59. The upgraded gasoline fraction 59 may then be recombined in blender 60 with the benzene lean gasoline stream 56, to provide a combined gasoline fraction 61.

The middle distillate product 58 of the additional fixed bed reactor suitably has improved attributes of quality of lower aromatic content, lower density, higher hydrogen content, and higher cetane number, when compared to the middle distillate fraction 23. A gas stream separated from this liquid product may be recycled to the hydroprocessing reactor or sent to the gas clean-up system.

That which is claimed is:

1. A process for producing liquid hydrocarbon products from solid biomass and/or residual waste feedstocks comprising:
   a) a first stage of hydropyrolysing the solid biomass and/or residual waste feedstocks in a hydropyrolysis reactor vessel in the presence of molecular hydrogen and one or more deoxygenation catalysts, to produce a product stream comprising partially deoxygenated hydropyrolysis product, $H_2O$, $H_2$, $CO_2$, CO, $C_1$-$C_3$ gases, char and catalyst fines;
   b) removing the char and catalyst fines from the product stream;
   c) a second stage of hydroconverting the partially deoxygenated hydropyrolysis product in a hydroconversion reactor vessel in the presence of one or more hydroconversion catalysts and of the $H_2O$, $CO_2$, CO, $H_2$, and $C_1$-$C_3$ gases generated in step a), to produce a vapour phase product comprising substantially fully deoxygenated hydrocarbon product, $H_2O$, CO, $CO_2$, and $C_1$-$C_3$ gases;

d) condensing the vapour phase product of step c) to provide a liquid phase product comprising substantially fully deoxygenated C4+ hydrocarbon liquid and aqueous material and separating the liquid phase product from a gas phase product comprising $H_2$, CO, $CO_2$, and $C_1$-$C_3$ gases;

e) removing the aqueous material from the substantially fully deoxygenated C4+ hydrocarbon liquid; and f) a third stage comprising combining an aliphatic hydrocarbon precursor or an aromatic hydrocarbon precursor with at least a portion of the substantially fully deoxygenated C4+ hydrocarbon liquid to form a resultant liquid, and co-processing the resultant liquid in a hydroprocessing reactor vessel in the presence of hydrogen and one or more hydroprocessing catalysts, wherein the aliphatic hydrocarbon precursor comprises one or more materials selected from triglyceride-containing components, algal oils, algal lipids, crude tall oil from pulp and paper production, mono- and diglycerides, free fatty acids, alkyl esters of fatty acids and greases; and wherein the aromatic hydrocarbon precursor comprises one or more materials selected from pyrolysis gasoline (pygas), FCC gasoline, coker naphtha and oxygenated hydrocarbons derived from lignin depolymerisation.

2. A process according to claim 1, wherein the third stage of the process further comprises a hydrotreating reactor containing one or more catalysts capable of hydrodesulfurisation and/or hydrodeoxygenation and the resultant liquid is co-processed in the hydrotreating reactor before being co-processed in the hydroprocessing reactor vessel.

3. A process according to claim 1, wherein the gas phase product comprising CO, $CO_2$, and $C_1$-$C_3$ gases is subjected to a reforming and water-gas shift process in order to produce hydrogen.

4. A process according to claim 1, wherein the deoxygenation catalyst comprises one or more sulfided metals selected from the group of nickel, molybdenum, cobalt and tungsten supported on an oxidic support selected from the group of alumina, silica, titania, ceria, zirconia, binary oxides and zeolites.

5. A process according to claim 4, wherein the deoxygenation catalyst comprises either a sulfided nickel/molybdenum catalyst on an alumina support or a sulfided cobalt/molybdenum catalyst on an alumina support.

6. A process according to claim 1, wherein the hydroconversion catalyst comprises one or more sulfided metals selected from the group of nickel, molybdenum, cobalt and tungsten supported on an oxidic support selected from the group of alumina, silica, titania, ceria, zirconia, binary oxides and zeolites.

7. A process according to claim 6, wherein the hydroconversion catalyst comprises either a sulfided nickel/molybdenum catalyst on an alumina support or a sulfided cobalt/molybdenum catalyst on an alumina support.

8. A process according to claim 1, wherein at least one of the one or more hydroprocessing catalysts comprises one or more metals selected from nickel, palladium, platinum, rhodium, iridium and ruthenium on an oxidic support.

9. A process according to claim 1, wherein at least two hydroprocessing catalysts are used.

10. A process according to claim 1, wherein before step f), the substantially fully deoxygenated C4+ hydrocarbon liquid is subjected to distillation in order to separate it into fractions according to the ranges of the boiling points of the liquid products contained therein and step f) is carried out on one or more of the fractions.

* * * * *